United States Patent
Hardebeck et al.

(10) Patent No.: US 10,262,327 B1
(45) Date of Patent: Apr. 16, 2019

(54) INTEGRATING SCREEN SHARING SESSIONS WITH CUSTOMER RELATIONSHIP MANAGEMENT

(71) Applicant: Glance Networks, Inc., Arlington, MA (US)

(72) Inventors: Ed Hardebeck, Brookline, MA (US); Richard L. Baker, Belmont, MA (US)

(73) Assignee: Glance Networks, Inc., Arlington, MA (US)

( * ) Notice: Subject to any disclaimer, the term of this patent is extended or adjusted under 35 U.S.C. 154(b) by 144 days.

(21) Appl. No.: 13/624,951

(22) Filed: Sep. 23, 2012

Related U.S. Application Data

(60) Provisional application No. 61/537,695, filed on Sep. 22, 2011.

(51) Int. Cl.
  *G06Q 10/10* (2012.01)
  *G06Q 30/02* (2012.01)

(52) U.S. Cl.
  CPC ............. *G06Q 30/02* (2013.01); *G06Q 10/10* (2013.01)

(58) Field of Classification Search
  CPC .......... H04L 12/1813; H04L 65/403–65/4053; G06Q 10/06; G06Q 10/00–10/30; G06Q 10/101; G06Q 10/10; G06Q 30/02–30/0284; G06F 3/048; H04M 3/5175–3/5191
  USPC ........................................................ 715/753
  See application file for complete search history.

(56) References Cited

U.S. PATENT DOCUMENTS

| | | | | |
|---|---|---|---|---|
| 7,023,979 | B1* | 4/2006 | Wu ...................... | H04M 3/5233 379/265.11 |
| 8,687,794 | B1* | 4/2014 | Spievak ................. | G06Q 30/02 379/207.02 |
| 2001/0014865 | A1* | 8/2001 | Franke ................... | G06Q 10/10 709/204 |

(Continued)

OTHER PUBLICATIONS

Seybold, Patricia, "Salesforce Invites End-Customers into its Social Media Groups: Great News for CABs!," made available Sep. 7, 2011, archived Sep. 20, 2011. https://web.archive.org/web/20110920201907/http://outsideinnovation.blogs.com/pseybold/2011/09/salesforce-invites-end-customers-into-its-social-media-groups-great-news-for-cabs.html.*

(Continued)

*Primary Examiner* — Jennifer N To
*Assistant Examiner* — Liang Y Li
(74) *Attorney, Agent, or Firm* — Anderson Gorecki LLP

(57) ABSTRACT

Customer Relationship Management software is integrated with a screen sharing capabilities to enable information about screen sharing sessions to be populated into records associated with the customer relationship management software. Sessions may be started from within the CRM software or may be started independently and information associated with the session may be captured and used to update the CRM records. Once the session has ended, information about who was invited to the session, who attended the session, and how long the session lasted is populated into the CRM record. Sessions may be scheduled in advance or implemented directly in real time. Managers may receive notice of the sessions by electing to follow sessions created by particular sales representatives, particular records, or other data objects. Dashboards may be used to summarize sessions to provide indications of how ses- (Continued)

sions are being used by sales professionals in connection with interaction with customers.

22 Claims, 18 Drawing Sheets

(56) References Cited

U.S. PATENT DOCUMENTS

| | | | |
|---|---|---|---|
| 2004/0047461 A1* | 3/2004 | Weisman | H04M 3/42008 379/202.01 |
| 2004/0107821 A1* | 6/2004 | Alcalde et al. | 84/608 |
| 2005/0021286 A1* | 1/2005 | Kunce | 702/179 |
| 2006/0053196 A1* | 3/2006 | Spataro | H04L 65/403 709/205 |
| 2006/0126812 A1* | 6/2006 | Carlson et al. | 379/156 |
| 2006/0208871 A1* | 9/2006 | Hansen | 340/506 |
| 2007/0106674 A1* | 5/2007 | Agrawal | G06Q 30/02 |
| 2007/0112647 A1* | 5/2007 | Borders | G06Q 10/0631 705/7.35 |
| 2007/0294368 A1* | 12/2007 | Bomgaars et al. | 709/217 |
| 2008/0092063 A1* | 4/2008 | Canfield et al. | 715/753 |
| 2008/0320150 A1* | 12/2008 | Boehringer et al. | 709/228 |
| 2009/0210271 A1* | 8/2009 | Abrams | 705/7 |
| 2009/0254843 A1* | 10/2009 | Van Wie et al. | 715/757 |
| 2009/0307001 A1* | 12/2009 | Gill | G06Q 10/10 705/1.1 |
| 2010/0128717 A1* | 5/2010 | Pickering et al. | 370/352 |
| 2010/0145755 A1* | 6/2010 | Narkilahti | 705/8 |
| 2010/0195808 A1* | 8/2010 | Kumar | G06Q 10/06393 379/88.13 |
| 2010/0235223 A1* | 9/2010 | Lyman | G06F 17/30997 705/7.13 |
| 2010/0257456 A1* | 10/2010 | Lieb et al. | 715/741 |
| 2010/0259593 A1* | 10/2010 | Beers et al. | 348/14.09 |
| 2011/0004888 A1* | 1/2011 | Srinivasan et al. | 719/329 |
| 2011/0173256 A1* | 7/2011 | Khalatian | 709/203 |
| 2011/0206198 A1* | 8/2011 | Freedman et al. | 379/265.03 |
| 2012/0005598 A1* | 1/2012 | Burckart et al. | 715/753 |
| 2012/0066175 A1* | 3/2012 | Pickering | 707/609 |
| 2012/0150888 A1* | 6/2012 | Hyatt et al. | 707/758 |
| 2012/0239619 A9* | 9/2012 | Hersh et al. | 707/628 |
| 2012/0317218 A1* | 12/2012 | Anderson et al. | 709/206 |
| 2013/0055113 A1* | 2/2013 | Chazin et al. | 715/758 |

OTHER PUBLICATIONS

Camrivox. "Camrivox Flexor CTI Demonstration (Microsoft Dynamics Edition)." YouTube. YouTube, Aug. 4, 2010. Web. Sep. 24, 2016. <https://www.youtube.com/watch?v=KY4UGPE89kQ>.*

Camrivox. "Camrivox Flexor CTI for Salesforce" Camrivox.com. Feb. 15, 2010. <http://web.archive.org/web/20100215140805/http://www.camrivox.com/media/content/file/Flexor_Salesforce_Walkthrough.pdf>.*

* cited by examiner

INTEGRATING SCREEN SHARING SESSIONS WITH CUSTOMER RELATIONSHIP MANAGEMENT

CROSS REFERENCE TO RELATED APPLICATIONS

This application claims priority to U.S. Provisional Patent Application No. 61/537,695, filed Sep. 22, 2011, the content of which is hereby incorporated herein by reference.

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

FIELD

The field relates to customer relationship management and, more particularly, to a method and apparatus for integrating screen sharing sessions with customer relationship management.

DESCRIPTION OF THE RELATED ART

Sales professionals, customer support personnel, and other professionals are often tasked with managing large amounts of information concerning details on customers, organizations, and situations with which they interact. Various computer systems have been developed to support sales professionals track contacts, leads, accounts, opportunities, and customers. Software of this nature is commonly referred to as Customer Relationship Management (CRM) software. When a CRM software user interacts with a customer or potential customer, the interaction is updated in the CRM software so that a record of the interaction is maintained and available at a later point in time in connection with subsequent interactions with the customer.

In connection with a sales presentation, it is often desirable to show the prospective customer information to help persuade the prospective customer to make a purchase. One way to do this is to use a screen sharing session, during which the customer is allowed to see information displayed on the salesperson's screen. Screen sharing sessions may also be used to allow the customer support professional to view the customer's screen, for example in connection with technical support. Since screen sharing sessions involve contact with customers, it would be desirable to enable screen sharing session information to be integrated with the CRM software.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter which is set forth by the claims presented below.

Customer Relationship Management software is integrated with a screen sharing capabilities to enable information about screen sharing sessions to be captured and populated into records associated with the customer relationship management software. Sessions may be started from within the CRM software or may be started independently and information associated with the session may be captured and used to update the CRM records. Information captured by the screen sharing service may be used to create customer contacts, leads, and other records in the CRM system. Once the session has ended, information about who was invited to the session, who attended the session, and how long the session lasted is populated into the CRM record. Sessions may be scheduled in advance or implemented directly in real time. Managers may receive notice of the sessions by electing to follow sessions created by particular sales representatives, particular records, or other data objects. Dashboards may be used to summarize sessions, to provide indications of how sessions are being used by sales professionals in connection with interaction with customers, and to provide other statistics associated with the use of screen sharing sessions.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of one or more embodiments of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
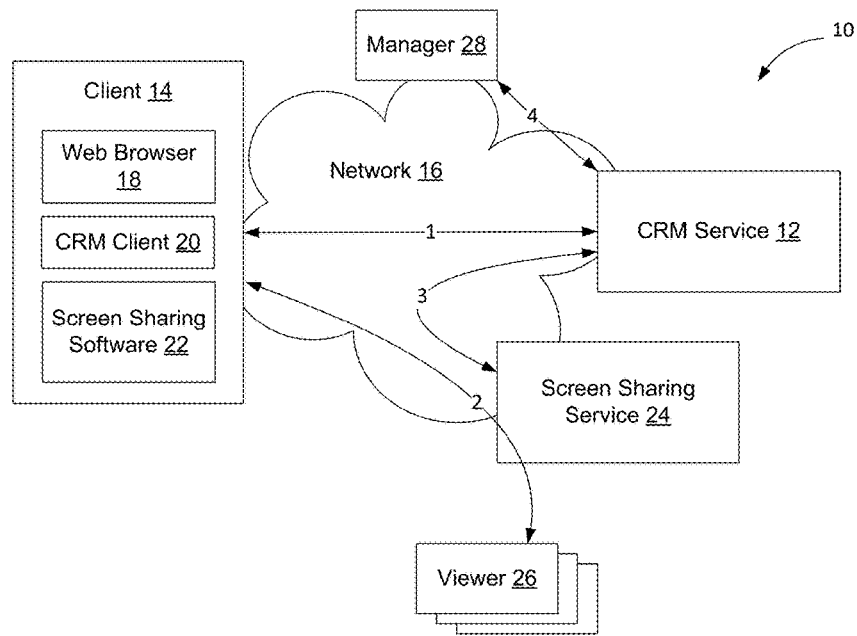
FIG. 1 is a functional block diagram illustrating the participants to a screen sharing session.

FIG. 1 shows an example network based system 10 in which information associated with screen sharing sessions is used to update records associated with a customer relationship management system. This allows the CRM system to capture metrics associated with screen sharing system to enable a historical record of the screen sharing session to be maintained and used in connection with evaluation of the utility of screen sharing sessions.

In the embodiment shown in FIG. 1, a Customer Relationship Management (CRM) service 12 is hosted on the network to provide customer relationship management services to clients 14. CRM service 12 provides hosted software which may be accessed by clients 14 from anywhere on network 16. Although a hosted CRM service will be assumed in the following description, CRM software may alternatively be implemented as stand-alone software installed and implemented on client 14. Example companies that provide CRM software or CRM services include Salesforce, Oracle, SharePoint, SugarCRM, Net Suite, Landslide CRM, and ZenDesk, although other CRM systems may exist as well. In the description set forth below in connection with FIGS. 2-15, an embodiment is described in which SalesForce™ CRM software has been configured to support screen sharing sessions. The invention is not limited to an implementation based on the SalesForce platform, however, as screen sharing sessions may also be integrated with one or more of these other CRM platforms.

In the example shown in FIG. 1, the client 14 includes a web browser 18 to access sites on network 16, such as a client portal hosted by CRM service 12 (arrow 1). Optionally, client 14 may include CRM client 20 to facilitate interaction with CRM service 12. CRM client 20 may be implemented as an applet or plugin to browser 18, or alternatively may be implemented as standalone software.

Screen sharing software 22 on client 14 is provided to capture information being displayed on all or a portion of the client's user display (e.g. monitor) and transmit this information to a screen sharing service 24. For example, where the client 14 has two monitors, the screen sharing software 22 may capture information being shown on one of the two monitors. The screen sharing software 22 and screen sharing service 24 enable viewers 26 to remotely see the information that appears on the client's display on a screen sharing session (arrow 2).

An example screen sharing service is described in greater detail in U.S. Pat. No. 7,847,755, entitled Method and apparatus for the identification and selective encoding of changed host display information, the content of which is hereby incorporated herein by reference. Another example screen sharing system is described in U.S. patent application Ser. No. 13/239,757, filed Sep. 22, 2011, entitled Method and Apparatus for Facilitating Participation in a Remote Viewing Session, the content of which is hereby incorporated herein by reference.

Other software for encoding and transmitting display information associated with client 14 may be utilized as well. Screen sharing sessions may be used, for example, by sales professionals to provide product demonstrations, to show potential customers information about products, and in myriad other ways. Likewise, screen sharing sessions may be used by technical support personnel to diagnose problems with a person's computer and to take corrective action to assist people experiencing technical difficulties with their computers.

According to an embodiment, clients 14 may initiate screen sharing sessions through an interface provided by the Customer Relationship Management (CRM) system. When started in this manner, parameters associated with the screen sharing session are used to update customer record(s) in the CRM system. The screen sharing service 24 also provides additional parameters to the CRM system (arrow 3) such as the duration of the screen sharing session once the screen sharing session has been completed. Where the screen sharing service captures new user information, i.e. user names, telephone numbers, email addresses, this information will be passed from the screen sharing service to the CRM system to enable new data objects for these newly learned contacts to be created.

Clients 14 may be used by sales professionals, technical support personnel, or other people interested in using CRM service 12. Optionally, in a hierarchically arranged organization, a manager 28 or other supervisor may wish to keep track of activities associated with the sales professionals. In one embodiment, CRM service 12 interacts with managers 28 to enable the managers to follow data objects available through the CRM service. The manager may be configured much the same as client 14, e.g. to include both CRM and screen sharing software. The data objects may be, for example, clients 14, screen sharing sessions (arrow 2), or other data objects of interest to the manager.

In this embodiment, the CRM service provides a collaborative application for members of an enterprise to connect and share information securely in real time. Specifically, the CRM service provides a secure social network for the business in which members (such as manager 28) may follow data objects such as people, projects, files, and documents. In one embodiment, the collaborative application may be extended to allow screen sharing sessions to be treated as data objects within the collaborative application, so that managers and other interested persons may be notified in real time when a client schedules a screen sharing session or when a client initiates a screen sharing session. People following the screen sharing sessions as data objects may be able to join the screen sharing session to monitor the screen sharing session as well.

FIGS. 2-15 show example screen shots of a CRM system in which screen sharing sessions may be launched from the CRM system and in which information associated with the screen sharing sessions is then used to update CRM records. The screen shots of the CRM interface shown in FIGS. 2-15 were taken from SalesForce™ CRM software. Screen sharing session integration may similarly be incorporated into other CRM software and, accordingly, the invention is not limited to an implementation in which SalesForce CRM software is used.

Figure 2:
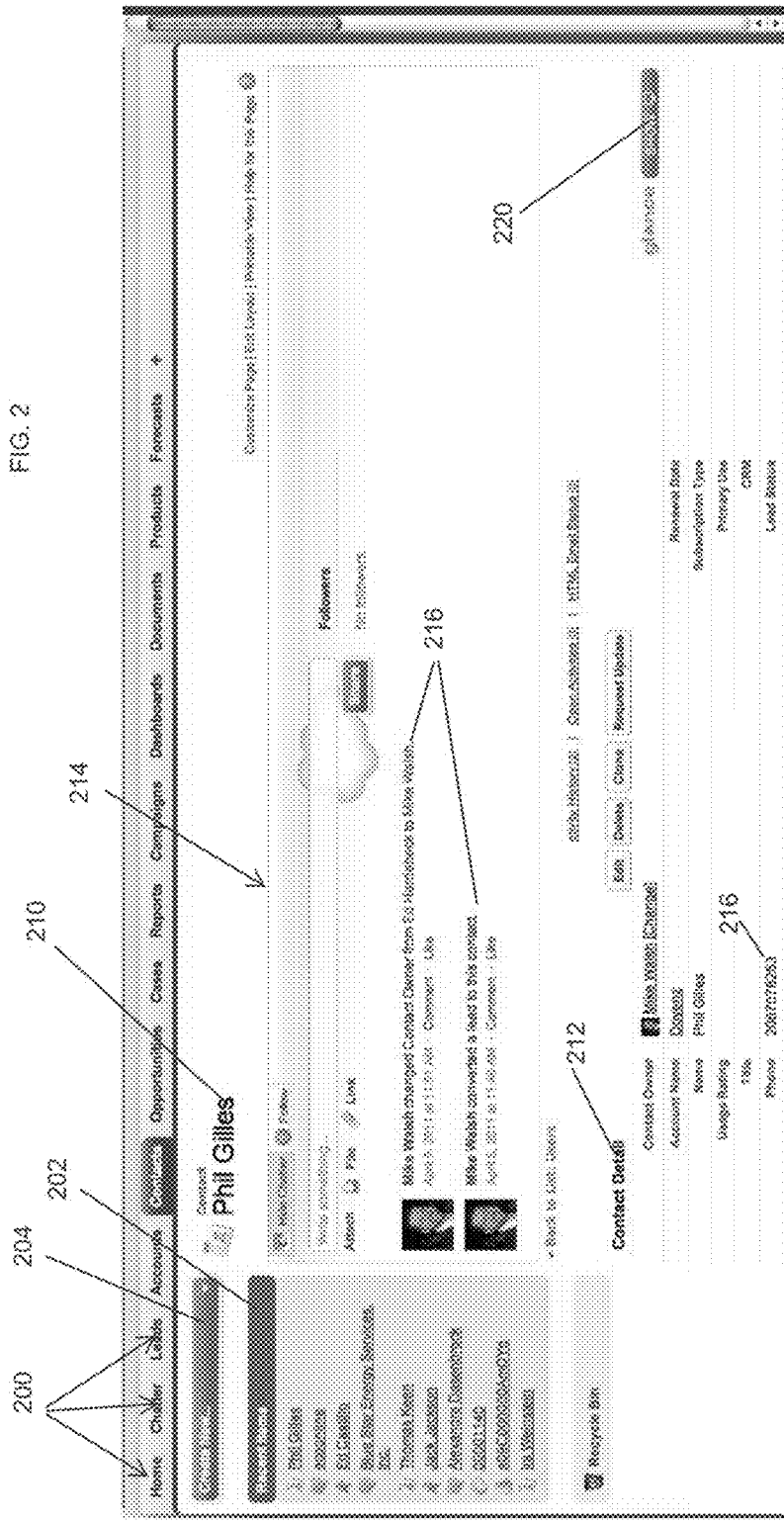
FIGS. 2-18 are screen shots showing an embodiment of an integrated customer relationship management software package with integrated screen sharing capabilities.

As shown in FIG. 2, the user interface provided by the CRM system has a plurality of tabs 200 which allow different features of the CRM system to be accessed. For example, in the illustrated embodiment the tabs include a home tab, chatter tab—which is used to access the collaborative application, several tabs associated with customers or potential customers (leads, accounts, contacts, opportunities, and cases), a reports tab that will allow reports to be generated and viewed, a dashboards tab that allows various metrics to be collected and compared in a variety of visual ways, as well as other tabs that allow access to other functions. The functionality of the CRM interface and the particular look and feel of the user interface depend on the particular company hosting the CRM software.

In the example shown in FIG. 2, the "contacts" tab has been selected and hence is highlighted. Within the contacts tab, a list of recent contacts is shown in the recent items box 202. A search box may also be provided to allow the user to search for contacts maintained by the CRM system. A "create new" button 204 is provided to enable the user to create a new contact. Once a contact has been selected, or created, the name of the contact 210 appears at the top of the contact record and details associated with the contact are provided in a contact detail section 212 of the record.

A collaborative application maintains a feed 214 of posts 216 showing changes to the contact record over time. Each time the contact record is updated, or an activity occurs related to the contact, the collaborative application adds a post to the feed. The feed is available in the customer record. Likewise, as discussed in connection with FIG. 13 below, users of the CRM system are provided with a user specific feed containing posts for data objects of interest.

As noted above, users can follow data objects such as contacts using the collaborative application. As users of the CRM system interact with the contact, the collaborative application posts changes to the status and other changes associated with the data object to the feed associated with the data object (which in this instance is the contact). Users that opt to receive updates to the data object are provided the update in real time via their personal feed. For example, a manager may monitor a set of contacts and receive posts in his feed whenever one of the sales personnel in his organization interacts with a customer record. The feed 214 shown in the contact screen contains the updates associated with the contact so that a person viewing the contact can see posts associated with the contact.

If a user clicks on the phone number 218, a phone call may be initiated by the CRM system, or by the client 14, to the telephone number selected by the user of the CRM system. According to an embodiment, a button 220 associated with the screen sharing system 22, 24 is provided which will allow the user of the CRM system to launch a screen sharing session through the CRM record. Specifically, when the user clicks on button 220, the screen sharing software 22 is called to initiate a screen sharing session. The CRM record through which the screen sharing session is launched is also updated to reflect this activity, for example by creating a post and adding the post to feed 214, so that the CRM system can keep track of screen sharing sessions and treat the screen sharing session as a unique form of communication with each contact, lead, or other form of data object maintained by the CRM system.

Figure 3:
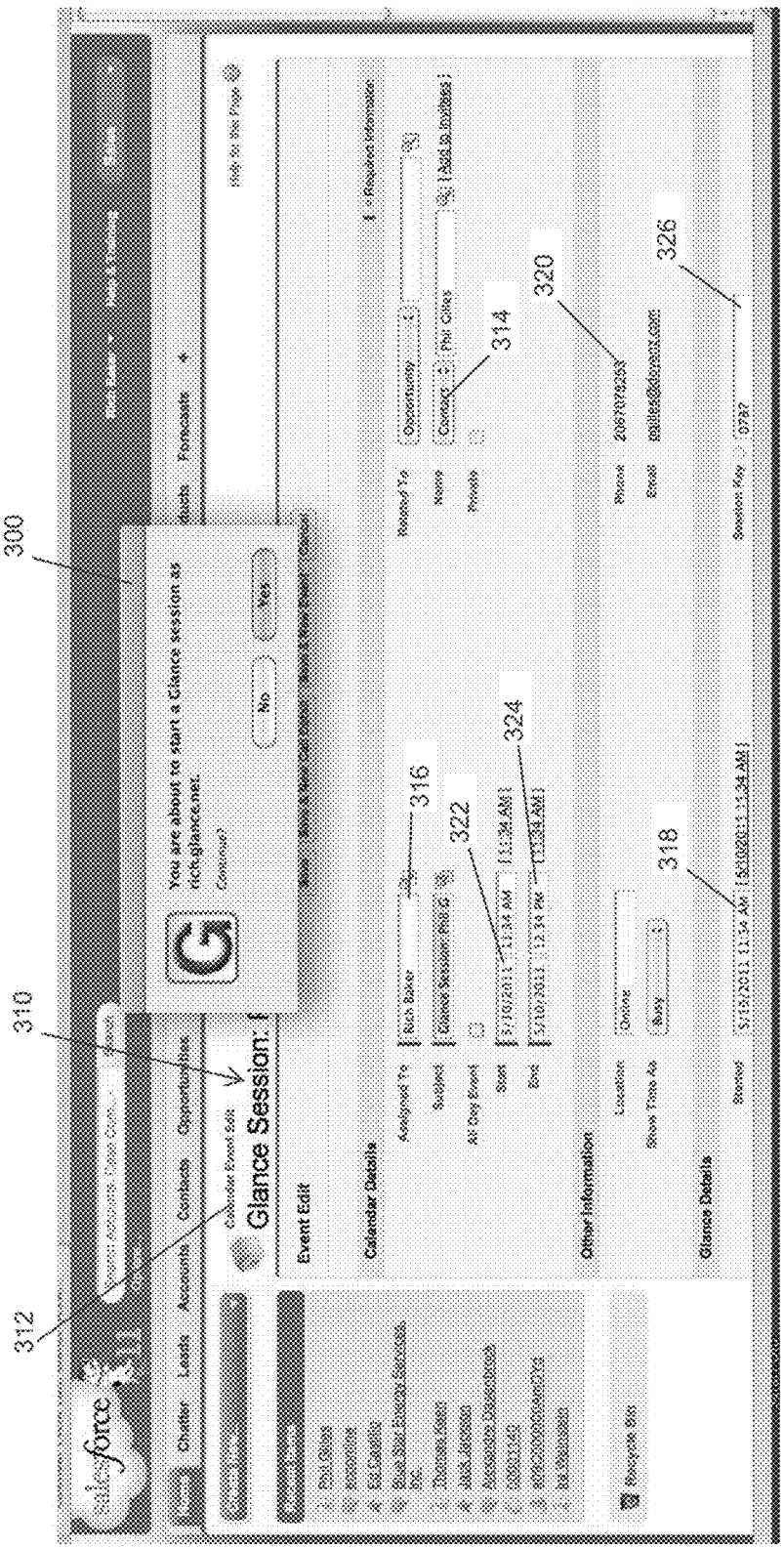

FIG. 3 shows the user interface when the screen sharing system button 220 is selected. As shown in FIG. 3, when the screen sharing system button 220 is selected, a notification 300 is provided by the screen sharing software alerting the user that the user is about to start a screen sharing session and asking if the user would like to continue. This provides the user with an opportunity to confirm that they would like to show their screen prior to initiating the screen sharing session.

In addition, selecting the screen sharing session button 220 causes the CRM interface to create a screen sharing session record and provide the user with a calendar event record interface 310. The calendar event record indicates that the type of calendar event is a screen sharing session (Glance session) 312 and provides details about the screen sharing session. In particular, the calendar event record shows that the screen sharing session is related to the contact where the screen sharing session was launched 314, who was logged into the CRM system and interacting with the record when the screen sharing session was launched 316, and the time when the session was launched 318. In addition, the contact information (e.g. phone number and email address) of the contact is provided 320 so that the user may initiate a telephone call with the contact in connection with establishing a screen sharing session.

Optionally, where the session included a security key, the security key 326 may be included in the CRM record as well. However, the use of security keys may be disabled to enable keyless sessions to be implemented via the screen sharing system. Keyless sessions let guests join a session more quickly and easily, because they do not need to type in a session key to join the session.

If the user selects the "yes" button to start the screen sharing session, the screen sharing software contacts the screen sharing system to notify the screen sharing system that a screen sharing session associated with the user will be starting. If a session key is to be used, the CRM also passes the session key to the screen sharing software to enable the screen sharing software client to specify the correct session key to the screen sharing service.

In one embodiment, the screen sharing system assigns a separate Internet address URI (Uniform Resource Identifier) to each user of the screen sharing system to enable screen sharing sessions associated with the user to be individually hosted at an address accessible over the Internet. The user can direct guests to use a browser to go to the Internet address to join the screen sharing session and, if necessary, tell the guests the session key to be input.

A screen sharing session will commence once at least one guest joins the session. During a session designed to show information appearing on the user's display (show button 530 selected), the screen sharing software will capture information from the display and pass the display information to the guest. During a session designed to enable the user to view the guest's screen (view button 540 selected) the screen sharing software will capture information from the guest's display and pass the display information to the user. Two example screen sharing services are described in greater detail in U.S. Pat. No. 7,847,755, entitled Method and apparatus for the identification and selective encoding of changed host display information, and U.S. patent application Ser. No. 13/239,757, filed Sep. 22, 2011, entitled Method and Apparatus for Facilitating Participation in a Remote Viewing Session, the content of each of which is hereby incorporated herein by reference.

The CRM system captures information associated with screen sharing sessions and uses the information to update CRM records. Since the screen sharing session is launched in the context of the CRM system, e.g. via buttons provided on a user interface of the CRM software, the CRM system is able to create data objects within the CRM system for the screen sharing session and also capture information related to the screen sharing session such as the start time of the screen sharing session 322.

The screen sharing system will handle establishment of the screen sharing session independent of the CRM system, however, so the CRM system will not know how long the screen sharing session will last.

The CRM system will keep track of screen sharing sessions that are launched through the CRM interface and, at a later point in time, e.g. once each hour, the CRM system will poll the screen sharing system 24 for additional details about these screen sharing sessions. The screen sharing system will thus provide the CRM system with additional information about the screen sharing sessions, such as the duration of the session, who attended the session, whether remote control was implemented on the session, and other details that may be of interest to persons using the CRM system. Thus, as shown in FIG. 3, at a later point in time the ending time of the session 324 will be populated into the CRM record associated with the screen sharing session.

It is possible for people who do not have objects in the CRM system to join screen sharing sessions launched through the CRM system. In this instance, when a user seeks to join a screen sharing session launched through the CRM system, the screen sharing session system can optionally request the user to input contact information, such as the user name, telephone number, email address, etc. This information will be captured by the screen sharing system and passed back to the CRM in connection with supplying details about completed screen sharing sessions. This allows information about new contacts to be provided to the CRM system, together with the information about the screen sharing session, to allow the CRM system to create new data records for the new user. For example, the CRM system may use the information about the new user to create a contact record such as the contact record of FIG. 2 and create a post indicating that the contact record was created in connection with a screen sharing session attended by the user.

Figure 4:
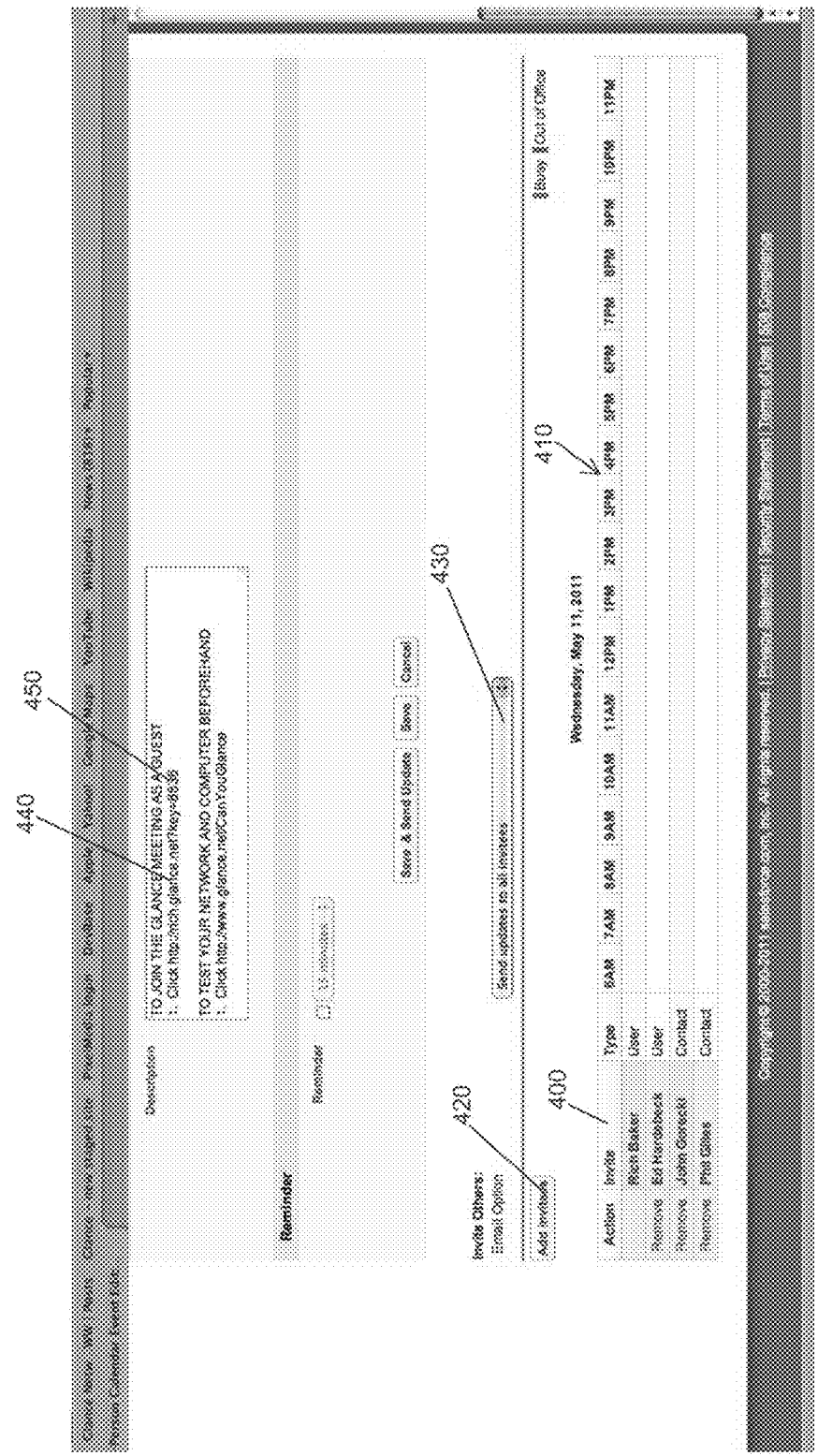

Screen sharing sessions may be implemented in real time, as shown in connection with FIG. 3, or may be scheduled as shown in FIG. 4. Likewise, screen sharing sessions may be scheduled as events as discussed below in connection with FIG. 15. As shown in FIG. 4, a user of the CRM system may schedule a screen sharing session and specify who should be invited to the session 400. The user may also specify the time 410 when the session is to occur. Through the CRM system, the user is able to invite the attendees 420 as well as send updates to the attendees 430 if the time for the screen sharing session changes. Invitees will receive a URL 440 for the session as well as the security code 450 to be used to access the screen sharing session.

Figure 5:
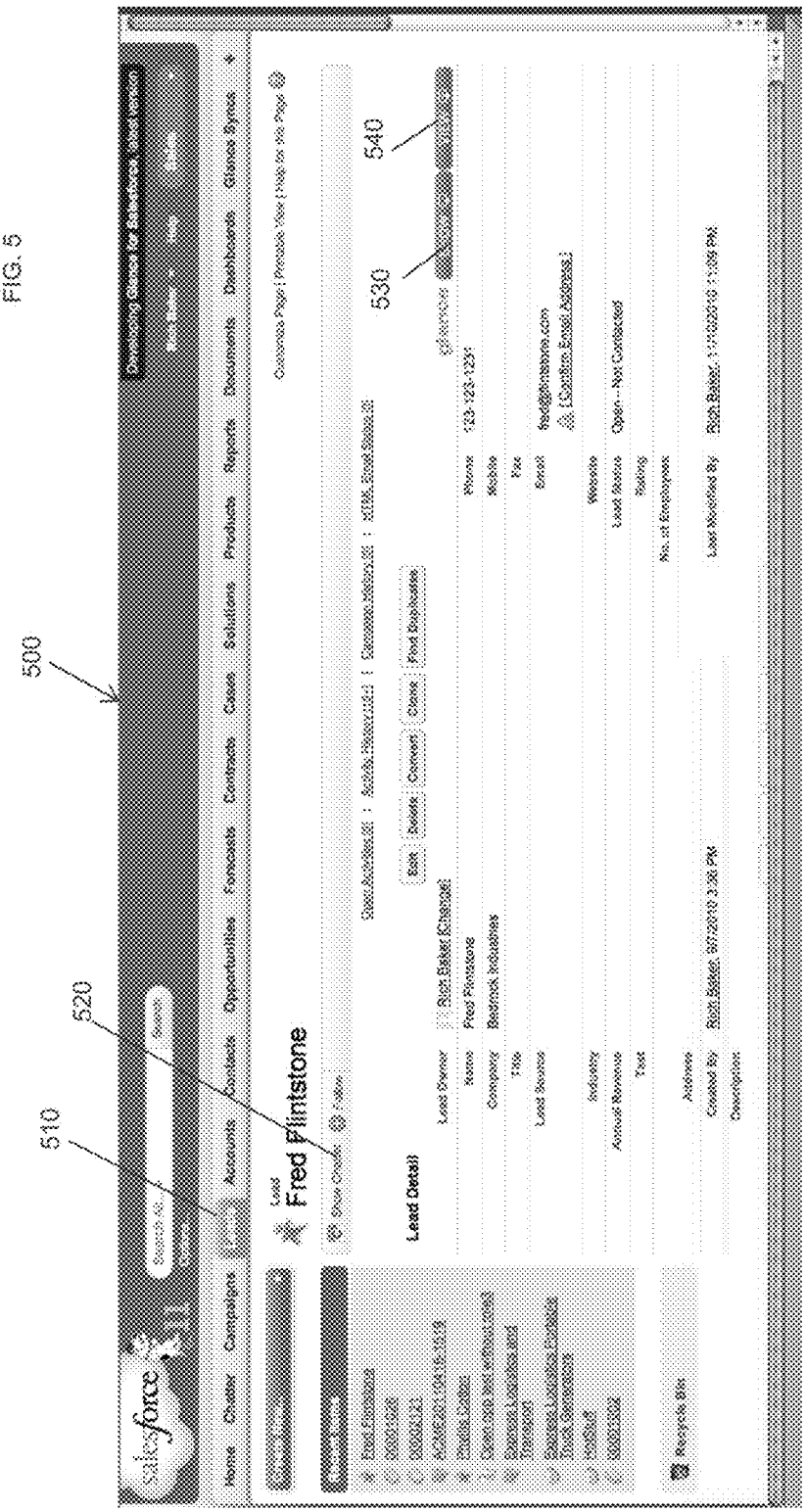

FIG. 5. shows an example leads screen 500 provided by the CRM system by selecting leads tab 510. The lead screen is similar to the contact screen shown in FIG. 2. In FIG. 5, the collaborative application feed box has been minimized. By clicking on tab 520 the collaborative application feed box will be expanded as shown in FIG. 2 to provide a feed of any activity posts associated with the lead.

As shown in FIG. 5, the lead screen, like the contact screen, includes one or more buttons 530, 540 associated with the screen sharing system that will allow the user to launch a screen sharing session. In the example shown in FIG. 5, there are actually two buttons 530, 540, that the user may select to launch screen sharing sessions. Specifically, button 530 may be selected to launch a screen sharing session in which the CRM system user's screen or portion of the user's screen is displayed on the screen sharing session, and button 540 may be selected to launch a screen sharing session in which the lead's screen initially will be displayed on the screen sharing session. Launching a session in which the lead's screen is displayed on the screen sharing session is particularly helpful in remote technical support situations where the person using the CRM system may be providing technical support to people over the network. Launching the screen sharing session in this mode allows the person using the CRM system to see what is being displayed on the lead's screen, and to control the lead's computer, so that the person using the CRM system is able to interact with the lead's computer to work to correct any technical difficulty the lead may be having with their system.

Figure 6:
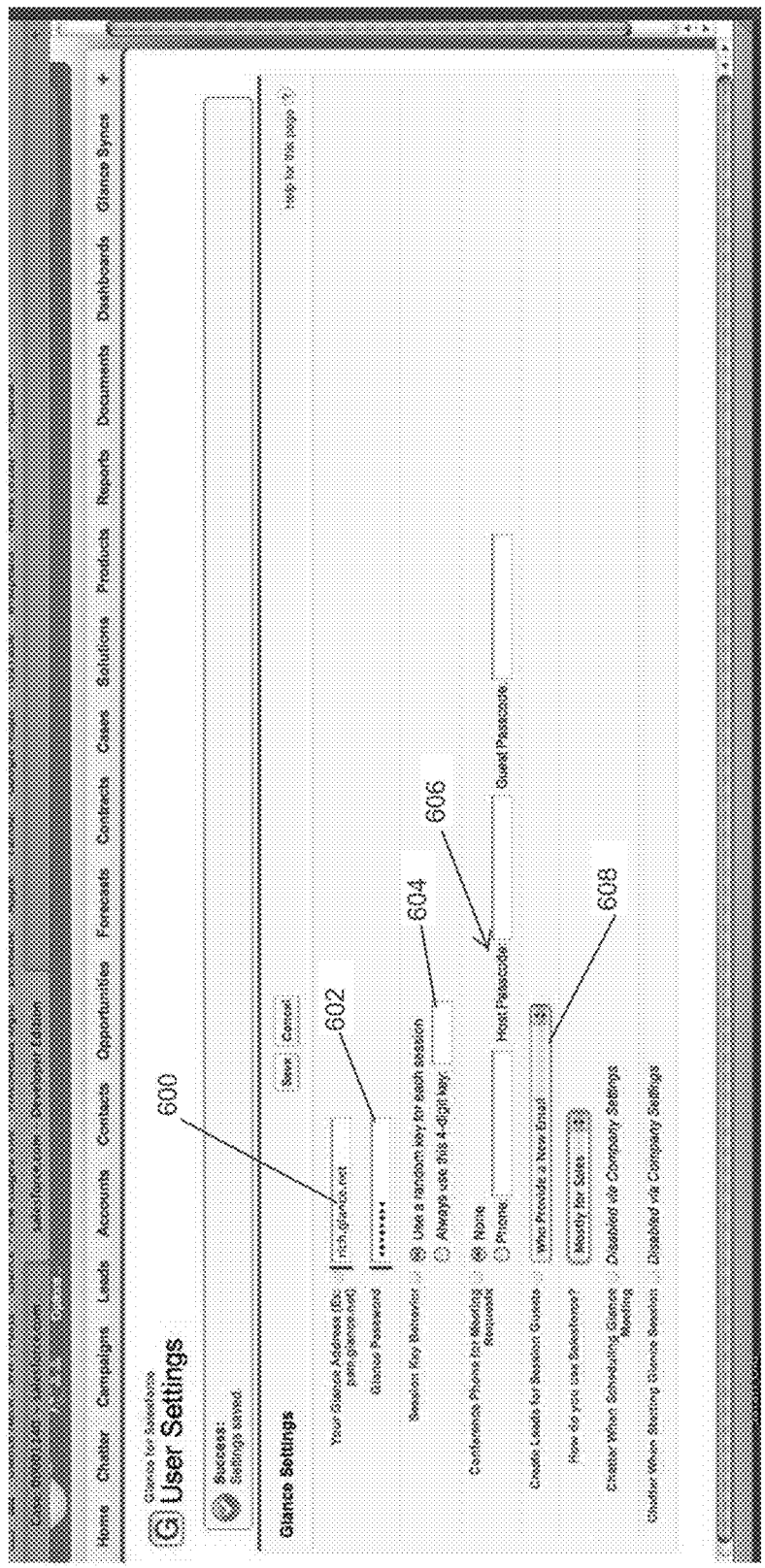

The manner in which the screen sharing software operates, in the context of the CRM system, may be customized as shown in FIG. 6. Specifically, as shown in FIG. 6, user settings for the screen sharing software (Glance software shown in FIG. 6) may be customized to make it easier for screen sharing sessions to be launched using the correct settings. For example, the user's address at the screen sharing service may be specified 600. In one embodiment, this address is assigned by the screen sharing service and is used by guests to join sessions launched by the user of the screen sharing service. Likewise, the user's password at the screen sharing service 602 may be included so that the user is not prompted to enter the password each time a screen sharing session is to be launched through the CRM system using the screen sharing service. Where the screen sharing service requires a session key, the session key may be selected to be randomly generated for each session or to be always set to a user specified value 604. Optionally, keyless sessions may be implemented as well in which no session key is required to be supplied to join a session.

The user may have a dedicated conference phone/bridge that is used for handling the audio portion of the screen sharing session. Information about the conference phone 606 may be specified via the user settings screen.

As noted above, there are times when it may be desirable to have the CRM System create a new contact data object or new lead data object when a person (who currently does not have a CRM record) participates in a screen sharing session. For example, a person using the CRM system may set up a screen sharing session with someone who does not have any contact information entered into the CRM system. When the person joins the screen sharing session, the person will be prompted to provide contact information. According to an embodiment, lead or contact records may be created in the CRM system as people provide contact information via the screen sharing system, to enable the contact information to be automatically captured by the CRM system. This information may be captured by the screen sharing system server and provided to the CRM when the CRM polls the screen sharing system server for information about recent screen sharing sessions.

Figure 7:
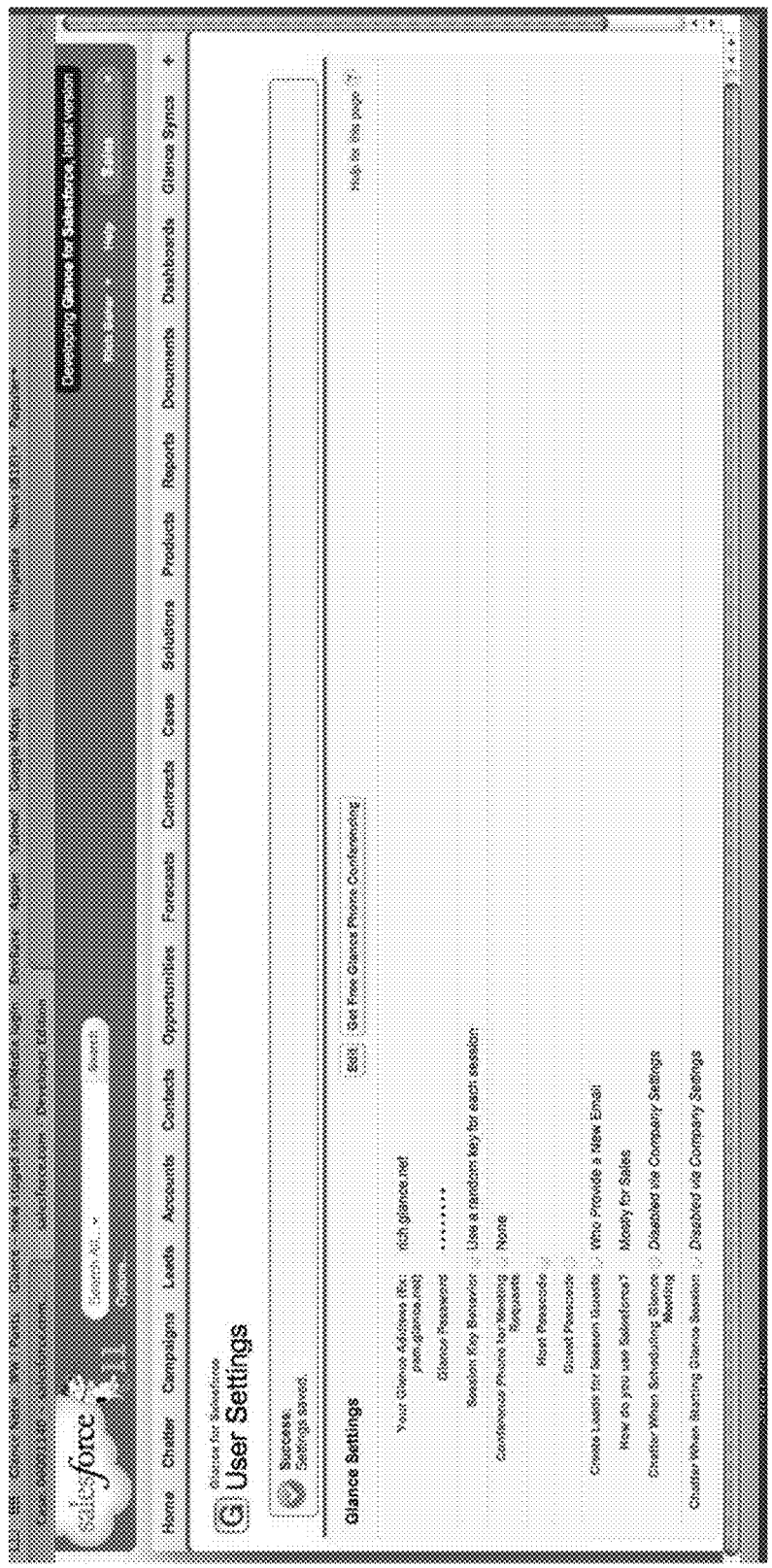

As shown in FIG. 6, the user can control whether lead/contact entries are created in the CRM system by specifying what level of detail is required to be entered into the screen sharing system before the lead/contact will be created in the CRM system. Specifically, field 608 allows the user to specify whether a new lead should be created whenever the new user enters their email address into the screen sharing system, whether a new CRM data object should only be created if the new user enters their phone number, or whether additional information should be entered by the user into the screen sharing system before a lead/contact data object is created in the CRM system. FIG. 7 shows the user settings screen upon successful completion of specification of the user settings via the screen shown in FIG. 6.

Figure 8:
Figure 9:
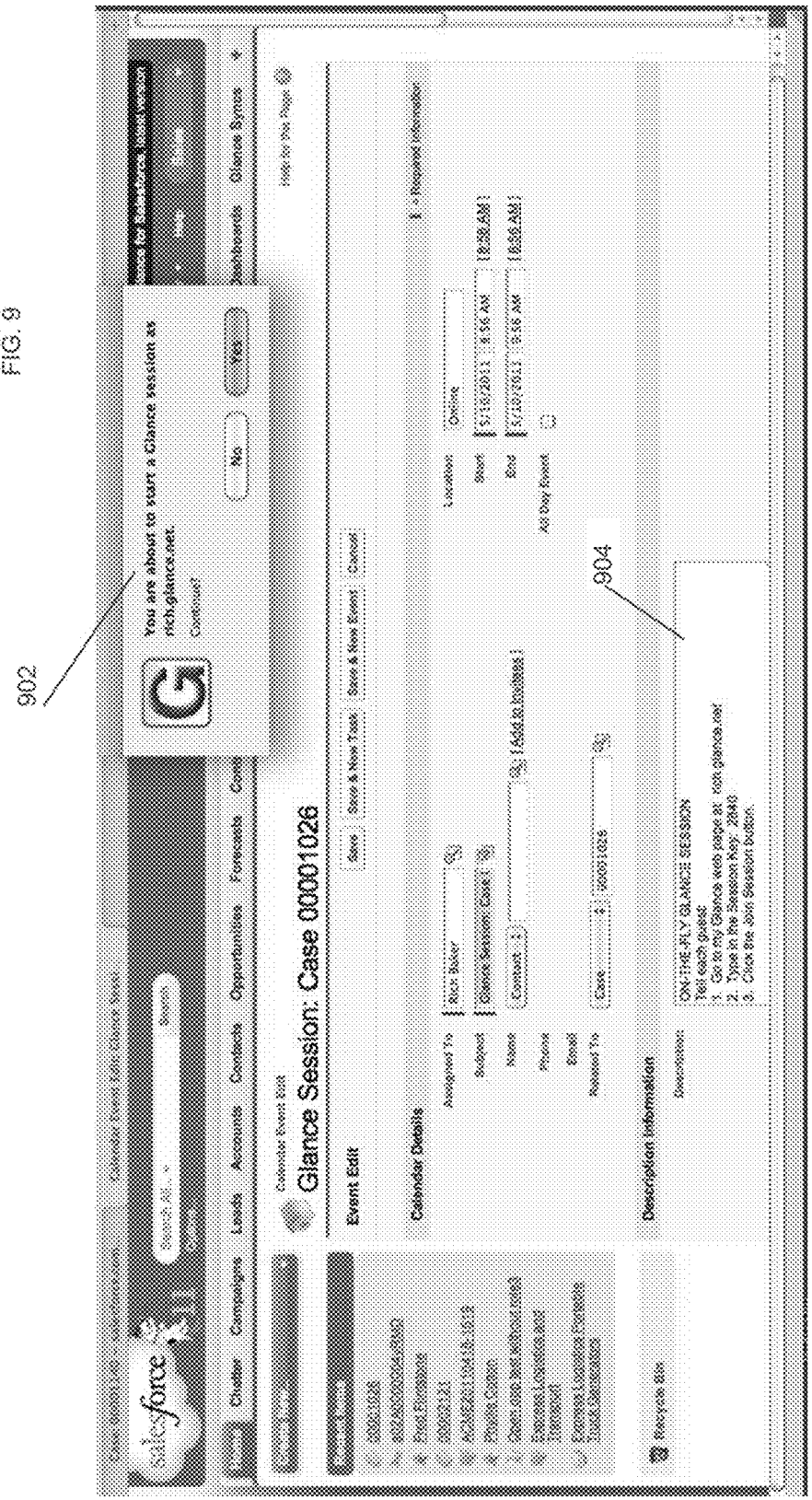

FIG. 8 shows a Case screen of the CRM system. As shown in FIG. 8, it is possible to launch a screen sharing session through the Case screen by clicking on button 800 (to show the user's screen) or button 802 (to view the remote participant's screen). If one of the buttons 800, 802 is selected, a calendar event is created as shown in FIG. 9 which is added to the CRM record for the case. A warning 902 alerts the user that a screen sharing session is about to be started, and instructions as to how people may join the session is provided in description field 904.

Figure 10:
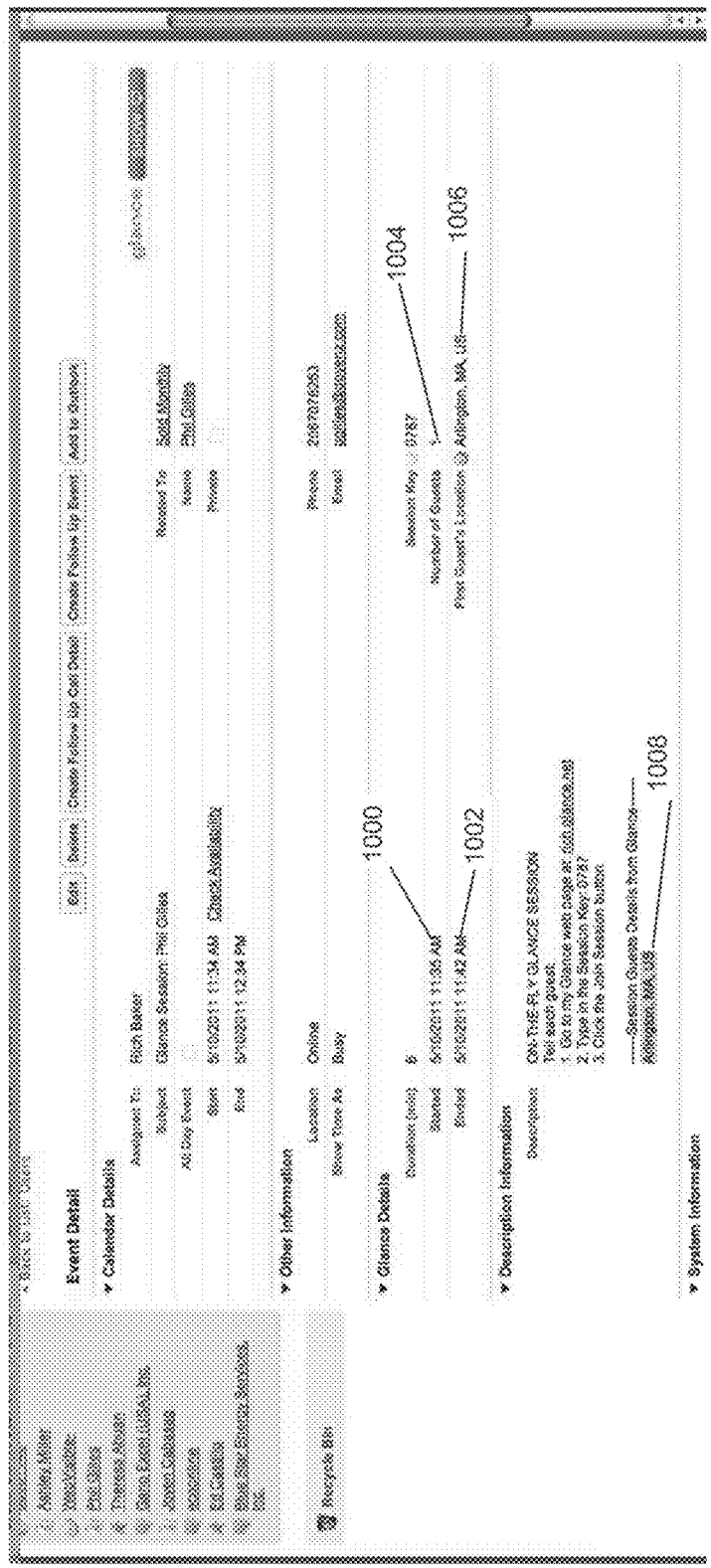

After the screen sharing session has ended, the record of the session will be added to the CRM system as shown in FIG. 10. The CRM system will know when the screen sharing session has started 1000, but will not necessarily know when the screen sharing session ended 1102. Accordingly, periodically the CRM system will poll the screen sharing system server information on screen sharing sessions, which will allow the CRM system to update its records with end times 1002 for the screen sharing sessions launched through the CRM system. The end time may be based on an actual end time received from the screen sharing session. Optionally, since the start time of the session at the screen sharing service may be different than the start time of the screen sharing session shown in the CRM system, the screen sharing system may also specify the duration of the screen sharing session.

The information from the screen sharing system will also allow the CRM system to know how many guests attended the session 1004, and the geographic area where the guests were located during the session 1006, 1008. The approximate geographical location of the guest may be determined by the screen sharing service from the guest's IP address, which will be provided to the screen sharing service when the guest joins the screen sharing session.

If users have entered contact information into the screen sharing system in connection with a session, this user contact information may be provided by the screen sharing system to the CRM in connection with the screen sharing session information. Likewise, if a participant to a screen sharing session has an account with the screen sharing system, the user contact information known by the screen sharing service may be provided by the screen sharing system to the CRM in connection with the screen sharing session information without requiring the user to input contact information in connection with joining the session.

In one embodiment, the CRM system is configured to periodically poll the screen sharing system to collect information about recent screen sharing sessions. For example, the CRM system may send a request to the screen sharing system once per hour to request information about screen sharing sessions.

If the screen sharing session software and CRM software are implemented to enable a session ID to be passed from the screen sharing session software to the CRM system, the CRM service can use these session IDs to request information about specific screen sharing sessions.

Alternatively, if session IDs are not know to the CRM system, other identifying information may be used to specify to the screen sharing system servers which sessions are relevant to the CRM system. For example, the CRM system will know the name of the CRM user who initiated the session and, as shown in FIG. 6, the CRM system stores the address 600 assigned by the screen sharing system for hosting screen sharing sessions associated with the user. Further, the CRM system knows the approximate time 1000 that the session was initiated. In one embodiment, these two pieces of information, optionally in connection with the session key, are used by the CRM system to submit requests for additional session details from the screen sharing system. Upon receipt of a request, the screen sharing system will perform a search for sessions associated with the user address that are proximate the time frame specified by the CRM system to identify the session of interest. Details associated with the session of interest are then forwarded from the screen sharing system to the CRM system to allow the activity records in the CRM system to be updated.

The screen sharing session start time in the CRM system and the screen sharing session start time in the screen sharing system may not be identical. For example, from the CRM perspective, the screen sharing session start time may be the time when the user clicks on one of the buttons 530, 540 to launch the screen sharing session via the CRM user interface. The screen sharing session may actually start, from a screen sharing system standpoint, at some later point in time. For example, in one embodiment the screen sharing system may log the start time of a screen sharing session as the time when a guest first joins the session.

To accommodate this potential discrepancy, a time span may be specified such that the request submitted by the CRM system to the screen sharing system contains a range (time-frame) during which the session is expected to have started. For example, the time-frame specified by the CRM system to the screen sharing system may encompass 2 minutes before the start time of the session in the CRM system (to account for any synchronization issues between the servers) and end 10-15 minutes after the start time of the session in the CRM system. These example time periods were selected based on the fact that, in one embodiment, the screen sharing system will time out a session initiation request if a guest has not joined within 10-15 minutes. In other embodiments the time periods may be adjusted depending on the particular implementation of the systems.

Optionally, where the session had a unique session key (e.g. session key 326), the CRM system knows the session key associated with the screen sharing system and may specify the session key to the screen sharing system as well to further help the screen sharing system identify the desired screen sharing session. Where the session is implemented as a keyless session, this additional piece of information is not available and, accordingly, the user name and time are used to identify sessions at the screen sharing system.

When the user's instance of CRM software synchronizes with the screen sharing service, the screen sharing service attempts to associate each session with its Activity object by using the user's address on the screen sharing service, which is unique for each host. Specifically, each person authorized to start screen sharing sessions on the screen sharing service has an address on the screen sharing service. For example, the screen sharing service may provide each user with a unique web address (e.g. charlie_brown.glance.net) which that user may then use to initiate screen sharing sessions. The CRM system has information about the user's address 600 on the screen sharing service and can provide that address to the CRM software when requesting synchronization information from the screen sharing service. The CRM software will also supply the screen sharing service with the approximate time and the session key (if available).

When the user starts a session, the CRM software creates a new Activity object and records the current time in the session field assigned to hold the start time. Later, after the session has ended, the CRM software will obtain the end time from the screen sharing service using this synchronization process. Optionally the CRM software may also obtain the actual time the session started from the screen sharing service.

There are instances where it is desirable to create statistics associated with information available through the CRM system. For example, a manager may want to monitor activities of sales professionals to determine what level of effort the sales professionals are exerting and to see what types of efforts are effective. For example, it may be that phone calls fare worse in generating sales than phone calls coupled with screen sharing sessions. The manager may want to monitor how sales professionals are using screen sharing sessions and encourage sales professionals who tend to not use screen sharing sessions to start integrating the use of screen sharing sessions into their daily routine.

By enabling a CRM activity to be created when the CRM user clicks the launch session button, metrics associated with the screen sharing session are able to be included in the user's CRM system. Typically, the CRM system is the user's system of record, which is used by the company to track metrics associated with performance of the salespersons and technical support personnel. By tracking metrics associated with screen sharing sessions within the company's system of record, the metrics associated with screen sharing sessions are able to be analyzed and compared with other metrics being measured by the system of record, so that analytics may be built to provide insight into the effectiveness of screen sharing sessions in the context of other activities. The analytics may be used to create dashboards, which graphically illustrate the screen sharing metric in the context of other metrics measured by the system of record. For example, the CRM system may create analytics to show how screen sharing sessions relate to closed sales, who is using screen sharing sessions effectively, and to otherwise show how screen sharing sessions are being used and their effect on performance in the context of other measured metrics.

Further, by integrating the launch of the screen sharing session through the user interface provided by the CRM system, the metrics associated with the screen sharing session are able to be collected accurately without requiring additional input from the user of the CRM system. Specifically, when the user clicks on the button to launch a screen sharing session, an activity is automatically created within the CRM system which enables the CRM system to track measurable metrics associated with the screen sharing session, such as who was in the session, the length of the session, and optionally a recording of the session. Additional metrics may also be obtained at a later point in time and synchronized with the activity record associated with the screen sharing session from the screen sharing system as discussed above.

Since the metrics are created within the context of the CRM system, the metrics associated with the screen sharing session are accurate (not reliant on user input data) and are able to be managed within the context of the system of record. The ability to manage the process of metric capture enables the metrics associated with screen sharing sessions to be related to all other metrics captured by the system of record, to enable analytics to be built relative to the screen sharing sessions. Likewise, capturing information through the screen sharing session enables new objects to be created within the CRM system, such as new lead objects, as information is learned through the screen sharing sessions.

Figure 11:
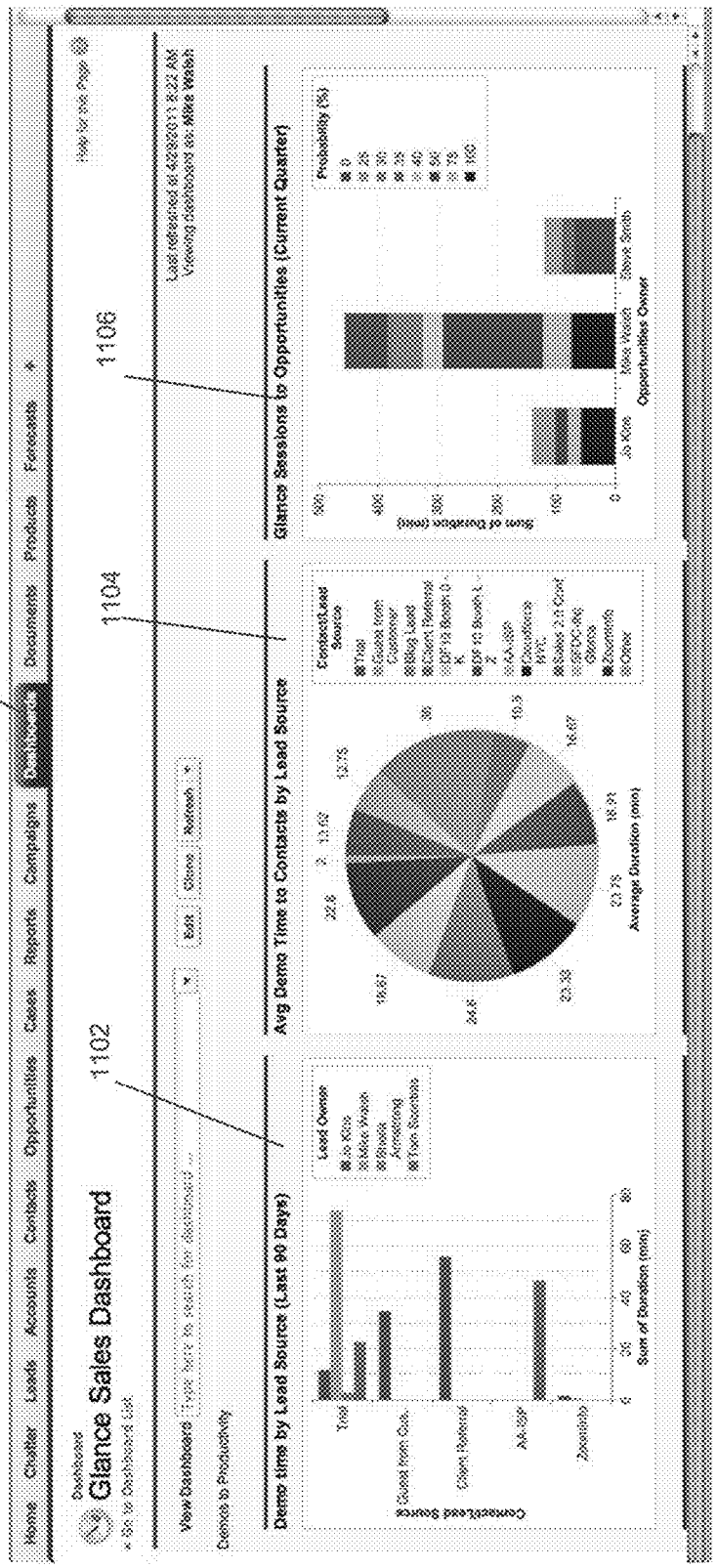

Myriad reasons for monitoring available statistics may be available. Accordingly, the CRM system includes a dashboards tab 1100 (see FIG. 11). Some example dashboards that may be available via dashboards tab 1100 are shown in FIG. 11. In FIG. 11, the dashboards included in this example are demo time by lead source 1102, average demo time to contact by lead source 1104, and screen sharing system (Glance) sessions to opportunities 1106. These example dashboards show examples of how statistics from the CRM system, and statistics received from the screen sharing service about screen sharing sessions launched through the CRM system, may be tracked to provide information about how sales professionals are using the screen sharing sessions in connection with sales activities. For example, dashboard 1106 shows the number of minutes each sales professional has logged in screen sharing sessions, together with the sales professional's ranking of the opportunity. The ranking indicates the professionals assessment as to the percentage likelihood of successfully concluding a sale with the opportunity. Likewise, dashboard 1104 shows the average duration of a screen sharing session broken down by the type of contact/lead.

Figure 12:
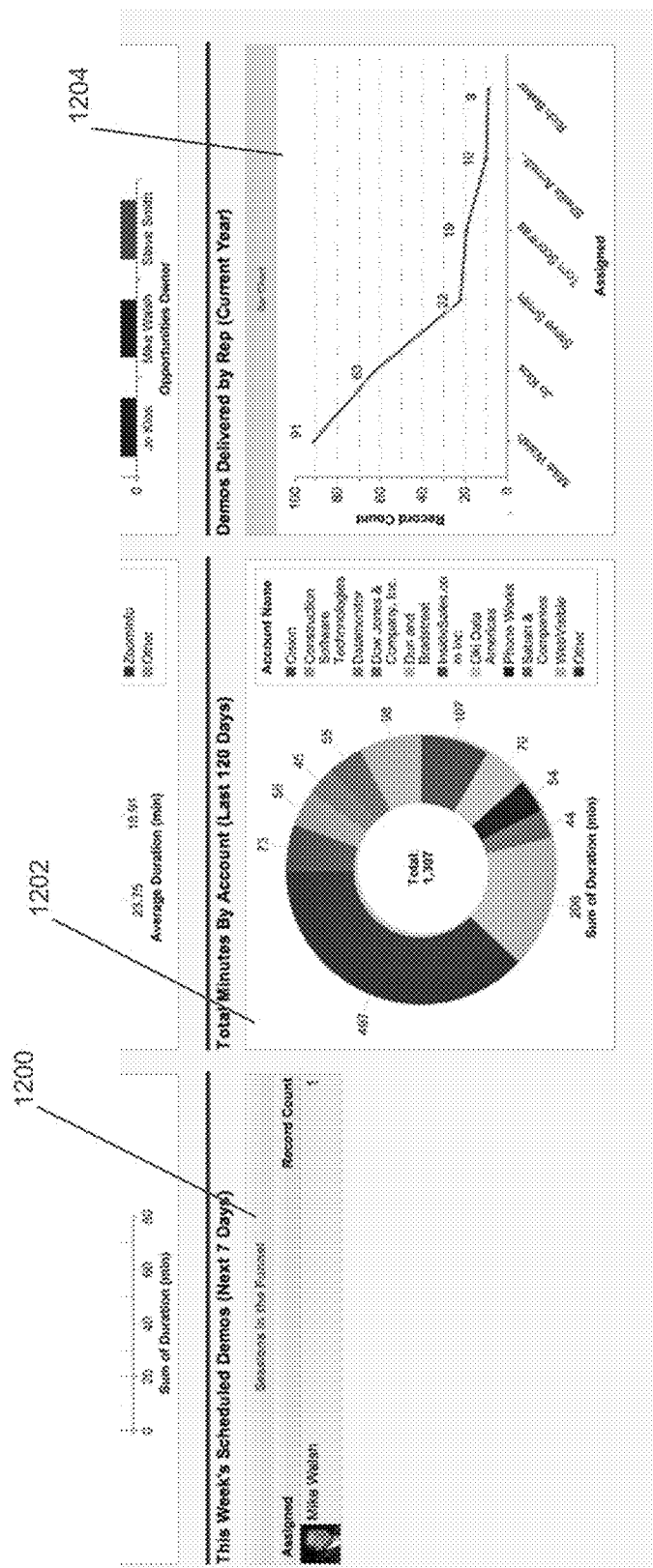

FIG. 12 shows additional dashboards that may be available via dashboard tab 1100. As shown in FIG. 12, the total number of scheduled screen sharing sessions 1200 may be provided, as recorded in the sales professional's calendar. Similarly, the total number of minutes logged in screen sharing sessions may be broken down by account 1202. Other statistics, such as the total number of screen sharing sessions per sales professional 1204 may also be displayed.

There are times that a manager or other person may want to join a screen sharing session that has already started. For example, as noted above, a manager may follow data objects such as calendar events, customers, or sales professionals, using the collaborative application. One of the types of events that may be followed, using the collaborative application, is screen sharing sessions. Specifically, when a screen sharing session is started by a particular sales professional, a data object associated with the screen sharing session will be created or updated to show the status of the screen sharing session. Anyone monitoring that data object or data object type will receive a notification (post) on a personal feed their collaborative application window indicating that the screen sharing session has started. The user of the collaborative application thus receives updates in their feed about all data objects that a particular user is following, so that whenever a data object is changed the user will receive a notification via the feed in their collaborative application window.

Figure 13:
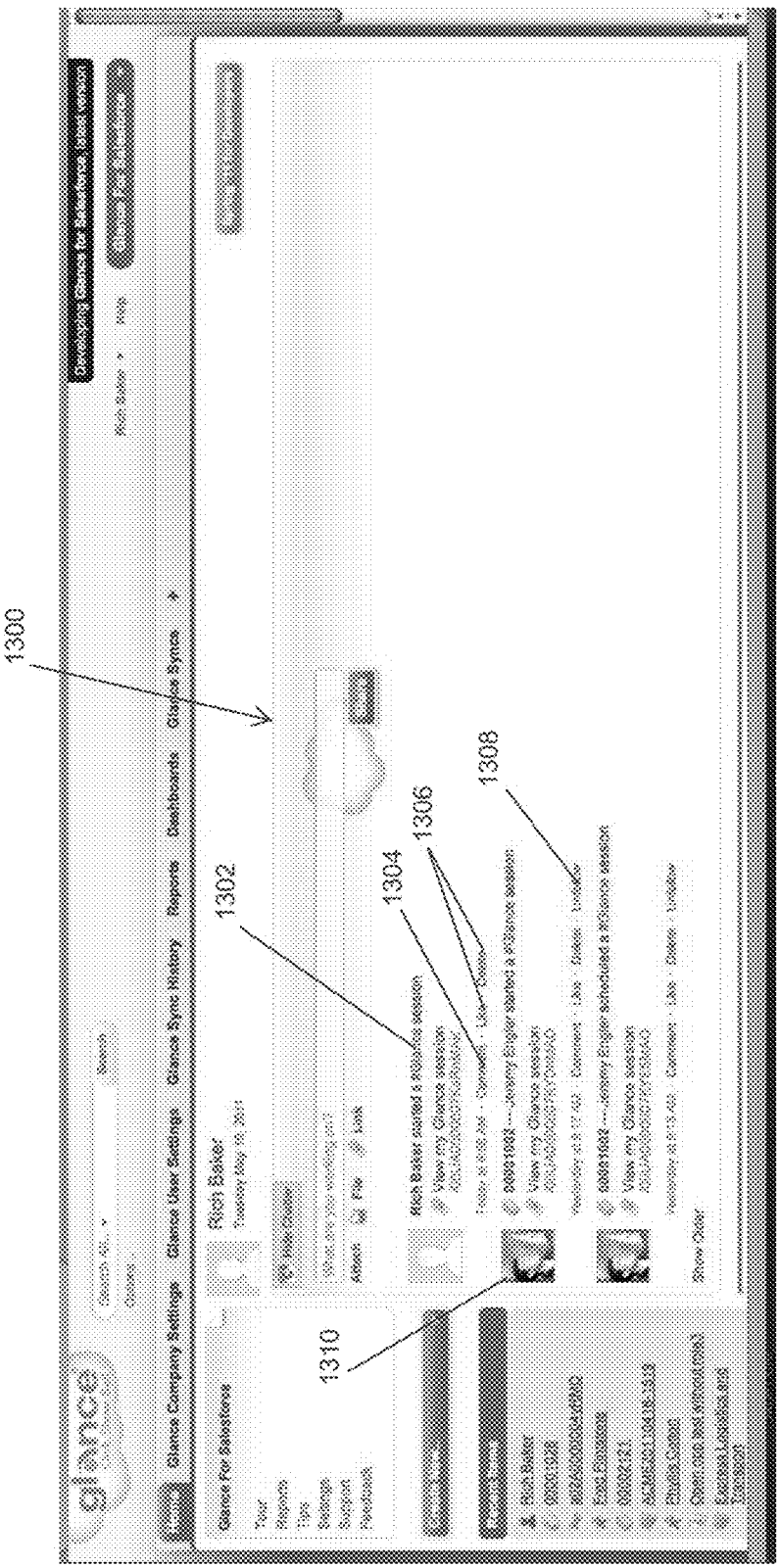

FIG. 13 shows an example view of the collaborative application window 1300 containing a feed of posts. In FIG. 13, one of the posts relates to a screen sharing session data object 1302. This allows a person following the screen sharing session data object to receive notifications (posts) about the data object, for example when the screen sharing session is launched. As shown in FIG. 13, as people schedule and start screen sharing sessions (titled a "Glance Session" data object 1302), other people who have elected to follow those data objects are provided with notifications via their personal collaborative application window 1300. Since each person using the collaborative application may be expected to be following a different set of data objects, the collection of notifications presented in the collaborative application feed will be unique for each CRM system user.

Users can comment on the objects 1304, indicate a like/dislike preference 1306, and elect to stop following particular objects 1308. For example, a user may see that one of the other sales professionals has scheduled a session with a particular customer. The user may use the comment tab to provide the sales professional with personal knowledge about what type of demonstration has worked well in the past with that particular customer, etc. Myriad different types of information may be shared using this system.

Figure 14:
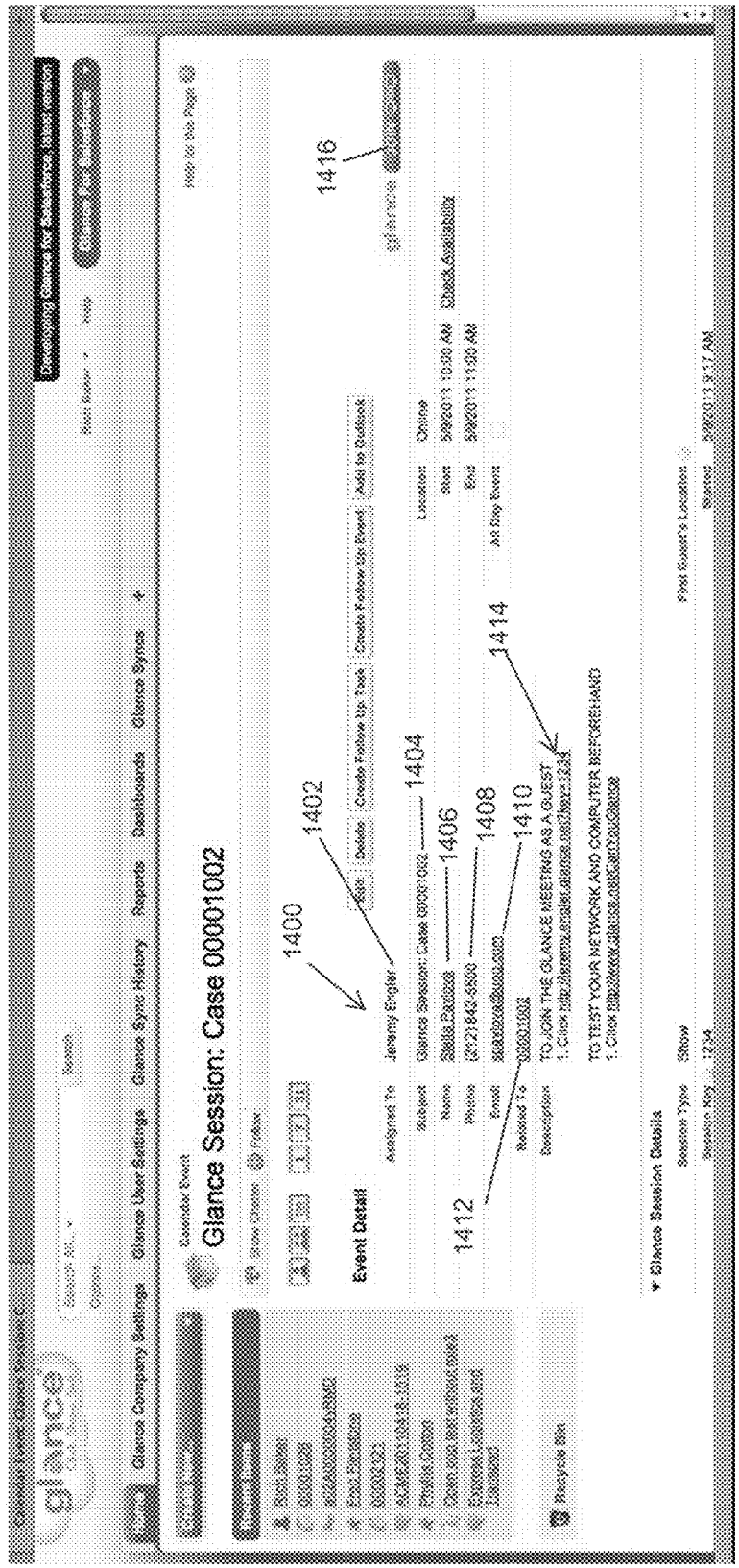

FIG. 14 shows an example screen which may be accessed by clicking on a data object associated with a screen sharing session via the collaborative application. For example, in FIG. 13, data object 1310 indicates that sales professional Jeremy Engler started a screen sharing session. By clicking on that data object, the user will be provided with additional details associated with the data object, as shown in FIG. 14.

As shown in FIG. 14, when a user selects a data object in the collaborative application associated with a screen sharing session, an event detail screen 1400 will be provided which contains information about the screen sharing session, such as the name of the person 1402 who started the screen sharing session, the subject of the screen sharing session 1404, the name of the remote participant 1406, the telephone number 1408 and email address 1410 of the remote participant, and a link to the case 1412 from which the screen sharing session was launched. A description of how to join the session 1414 is also included. Where the user of the collaborative application has management privileges, the user may be allowed to join the screen sharing session without the other participants knowing that s/he has joined, to enable monitoring of the screen sharing session.

Events and activities are often visible to a user's supervisors. If a CRM user such as a supervisor opens an object that they didn't create (i.e. is owned by another CRM user), the event object will contain a "join" screen sharing button instead of the show and view screen sharing buttons. The join screen sharing button, if clicked, causes the user's browser to use the parameters associated with the event object, e.g. the user's address at the screen sharing service 1414 and the key assigned to this event (if any), to instantly join the session. This provides a convenient way for the supervisor or other CRM user to join a session while maintaining ownership of the screen sharing session with the person with ownership of the event object in the CRM system. For example, clicking the join button 1416 will cause a browser to launch and go to the URL specified in contact field 1414 to enable the user to join the session.

Figure 15:

FIG. 15 shows a screen shot of a calendar event. Users of the CRM software create Event objects to schedule upcoming meetings and alert them when the time arrives. If they know beforehand that the Event will involve a screen sharing session, the user can click a button to schedule a screen sharing session. The event that is created will be a screen sharing event 1500 containing show screen sharing button 1502 and view screen sharing button 1504. Clicking on one of the screen sharing buttons will cause notification 300 to appear (see FIG. 3) and, assuming the user elects to continue, will cause a screen sharing session to start.

Users can create event objects in other ways as well, e.g. other than explicitly selecting to schedule a screen sharing session. In one embodiment, whenever an event is created, the screen sharing buttons 1502, 1504 are included in the event object. Whenever a screen sharing session is started from the event, the metrics for the screen sharing session will be attached to the event object and updated during the next synchronization operation.

Figure 16:
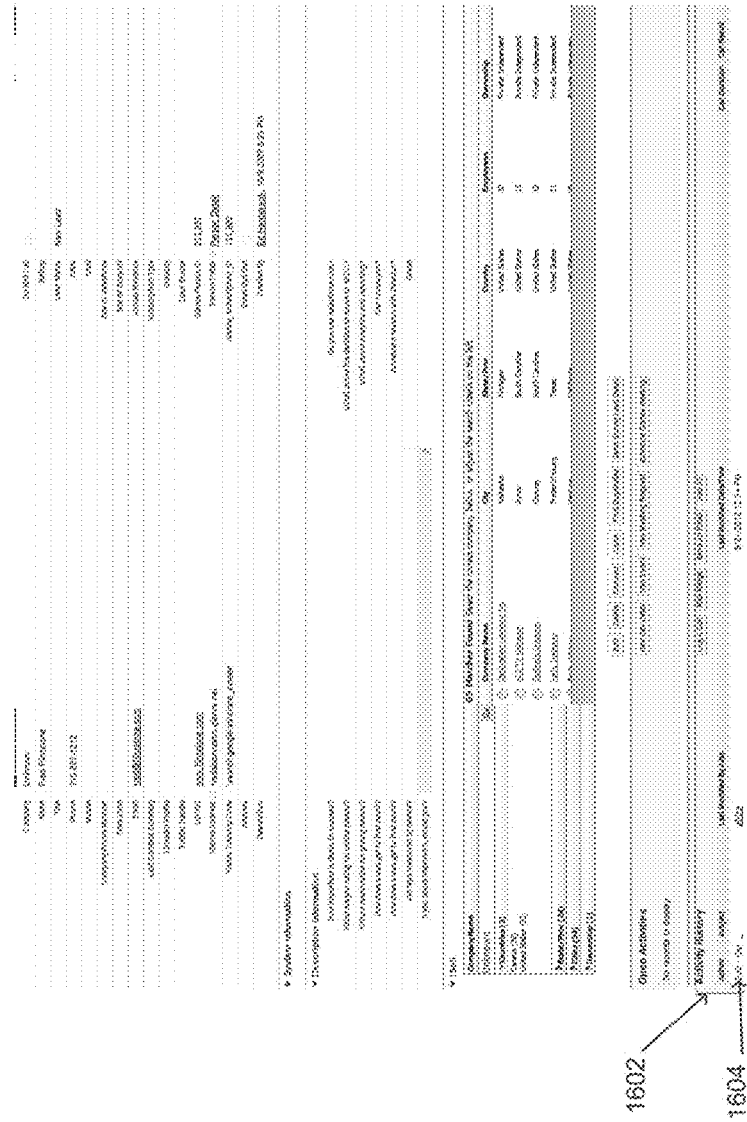
Figure 17:
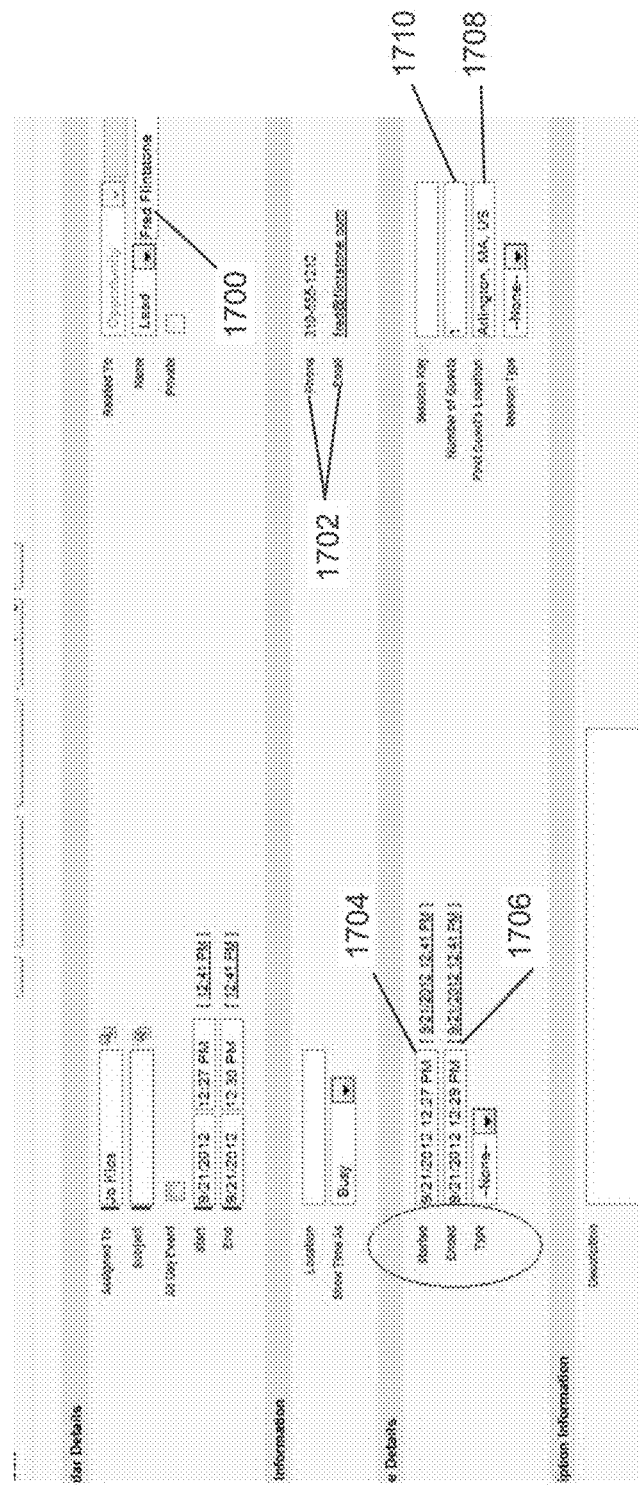
Figure 18:
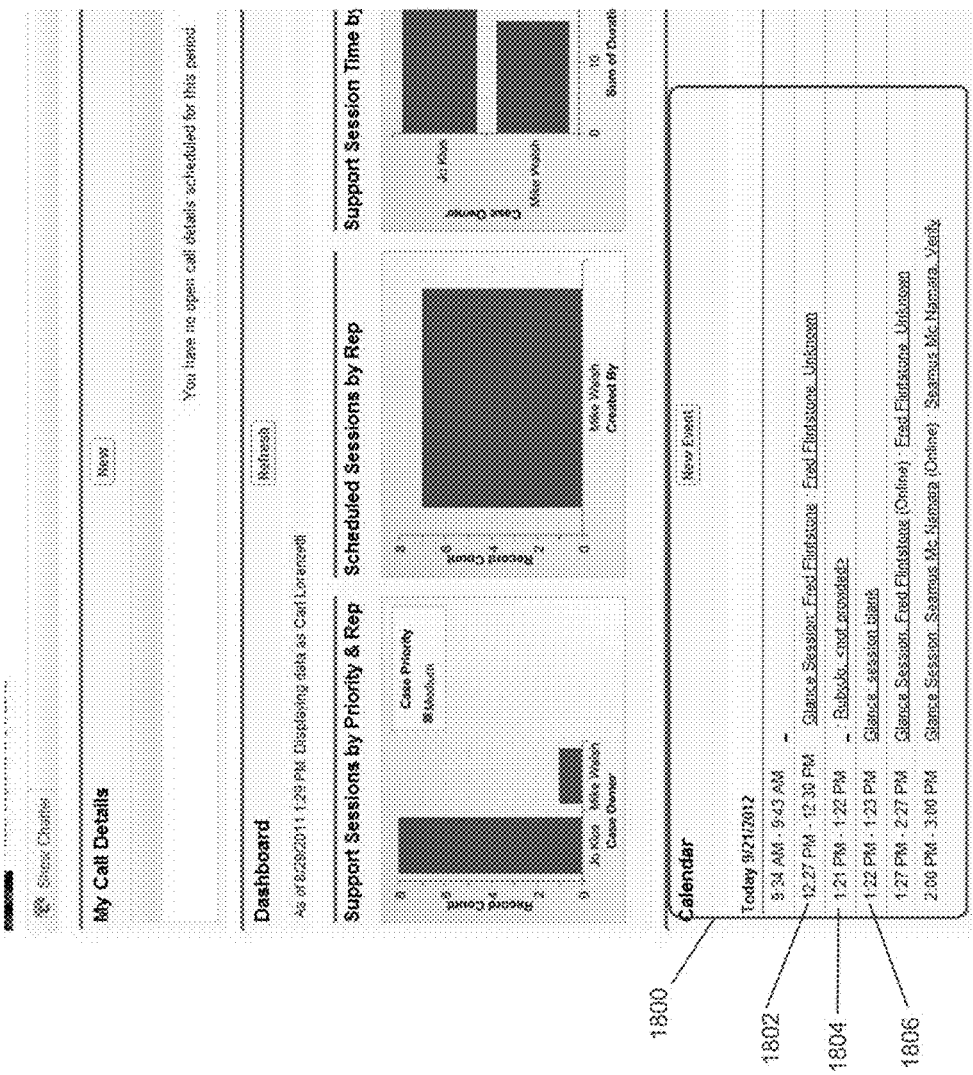

FIGS. 16-18 show an embodiment in which screen sharing sessions started outside of the CRM system are able to be captured by the CRM system during the synchronization process and used to create activities within the CRM system. Where contact information is able to be captured by the screen sharing system, these activities may be associated with a contact record within the CRM system.

In FIG. 16, a Lead object was added to the CRM system under the name "Fred Flintstone." A screen sharing session was then started from outside of the CRM system by directly interacting with the screen sharing software 22 on client 14. A guest joined the session from another computer and entered "Fred Flintstone's" name, email, and phone number. The Activity object shown in FIG. 16 was created for the session and attached to the existing Fred Flintstone Lead object. In FIG. 16, Activity 1600 that was created during this synchronization process is shown in the Activity History field 1602.

FIG. 17 shows how the Activity appears if opened by clicking on Activity 1600 in FIG. 16. As shown in FIG. 17, the Activity has been associated with lead Fred Flintstone 1700 and contains Fred Flintstone's contact information 1702. The Activity also includes the start time of the session 1704 and end time of the session 1706. The approximate location of the guest is also included 1708. The Activity will be attached to the CRM user who started the session from the screen sharing software using the user address at the screen sharing system to determine the owner of the Activity within the CRM system.

As shown in FIG. 17, the synchronization process will also supply information about the number of guests 1710 who joined the session. There may be instances in which multiple guests join the session who have records within the CRM system. In one embodiment, if the CRM system is only able to attach the activity to one of the lead objects, the CRM system will attach the Activity to the lead object of the first user to join the session. Other ways of determining how to attach an Activity to a lead where multiple guests have customer records in the CRM system may be implemented as well.

If a person who joins a screen sharing session does not exist within the CRM system, then the CRM system may create a lead object for the person if sufficient identifying information is supplied by the user in connection with joining the session. For example, if a lead does not exist in the CRM system, and a guest supplies user identifying information in connection with joining the session, such as by entering their name, email address, and phone number, a new Lead object will be created in the CRM system and an activity, such as the activity shown in FIG. 16, will be created and attached to the new lead object.

If a session is started from outside the CRM system, and the guest does not enter identifying information (or enters insufficient identifying information) in connection with joining the screen sharing session, the CRM object will create an activity object for the session but will not attach the activity object to any lead or other contact based object in the CRM system. In this instance, an activity object will be added to the CRM user's calendar.

FIG. 18 shows an example of how activities appear in a CRM user's calendar when screen sharing sessions are launched outside of the CRM system. In the example shown in FIG. 18, the CRM system provides a calendar 1800 of activities. Activity 1802 was created in a first scenario, in which a screen sharing session was started outside of the CRM system, the guest entered identifying information, and the CRM system was able to match the guest entered identifying information with a customer record within the CRM system.

Activity 1804 was created in a second scenario, in which a screen sharing session was started outside of the CRM system, the guest entered identifying information, and the CRM system was not able to match the guest entered identifying information with a customer record within the CRM system.

Activity 1806 was created in a third scenario, in which a screen sharing session was started outside of the CRM system and the guest did not enter identifying information. In this instance there is no guest information for the CRM system to use and accordingly the CRM system will not attempt to match the activity with a customer record within the CRM system. In this instance the activity will simply be added to the CRM user's calendar as a prompt to remind the CRM user to create a contact record for the guest in the CRM session and/or to attach the screen sharing session Activity to an existing contact record within the CRM system.

The methods described herein may be implemented as software configured to be executed in control logic such as contained in a CPU of an electronic device such as a computer. The functions described herein may be implemented as sets of program instructions that are stored in a non-transitory tangible computer readable medium. When implemented in this manner, the computer program includes a set of instructions which, when executed by a computer, cause the computer to perform a method to implement the functions described above. Programmable logic can be fixed temporarily or permanently in a non-transitory tangible computer readable medium such as a read-only memory chip, a computer memory, a disk, or other storage medium. In addition to being implemented in software, the logic described herein can be embodied using discrete components, integrated circuitry, programmable logic used in conjunction with a programmable logic device such as a Field Programmable Gate Array (FPGA) or microprocessor, or any other device including any combination thereof. All such embodiments are intended to fall within the scope of the present invention.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for improving accuracy of information managed by a Customer Relationship Management (CRM) system, the computer program comprising instructions which, when executed by a computer, cause the computer to perform a method comprising the steps of:
   accessing, by an agent computer, a customer record of a Customer Relationship Management (CRM) service in connection with a telephone call between an agent and a customer associated with the customer record, the CRM service having a CRM database containing information about customers;
   using a feature of the customer record to instruct a session hosting service to initiate hosting of a visualization session on a communication network with the customer during the telephone call with the customer, the visualization session being independent of the telephone call and including transmission of visual information under the control of the agent to the customer on the communication network or transmission of visual information under the control of the customer to the agent on the communication network, the session hosting service being independent of the CRM service and hosted on a server on the communication network separate from a server hosting the CRM service;
   automatically creating a CRM record associated with the visualization session by the CRM service in connection with instructing the session hosting service to initiate hosting of the visualization session, the CRM record being associated with the customer record;
   polling the session hosting service by the CRM service at a point in time after completion of the telephone call to obtain accurate parameters about visualization sessions associated with the agent that were hosted by the session hosting service in a preceding time interval;
   updating the CRM record associated with the visualization session by the CRM service in the CRM database using at least some of the accurate parameters obtained from the session hosting service during the step of polling;
   after conclusion of the first communication session, obtaining contact information about a guest other than the customer participating in the visualization session from the session hosting service by the CRM service; and
   using the contact information by the CRM system to automatically create a new CRM object for the guest to be included in the CRM database without requiring the contact information to be manually input by the agent.

2. The non-transitory tangible computer readable storage medium of claim 1, wherein the customer record is a data object in the CRM service designed to organize customer contact information.

3. The non-transitory tangible computer readable storage medium of claim 1, wherein the accurate parameters obtained from the session hosting service include an end time of the visualization session.

4. The non-transitory tangible computer readable storage medium of claim 1, wherein the accurate parameters obtained from the session hosting service include a duration of the visualization session.

5. The non-transitory tangible computer readable storage medium of claim 1, wherein the accurate parameters obtained from the session hosting service include a number of guests that joined the visualization session.

6. The non-transitory tangible computer readable storage medium of claim 1, wherein the accurate parameters obtained from the session hosting service includes an approximate geographic location of the guest that joined the visualization session.

7. The non-transitory tangible computer readable storage medium of claim 1:
   wherein the step of instructing the session hosting service to initiate hosting the visualization session is implemented via a graphical user interface provided by the CRM service; and
   wherein the step of polling the session hosting service is implemented by periodically polling the session hosting service, by the CRM service, to request additional information about visualization sessions initiated from the CRM service.

8. The non-transitory tangible computer readable storage medium of claim 7, wherein the CRM service identifies the visualization session initiated from the CRM service by specifying information about the agent and a time range expected to encompass an initiation time of the visualization session at the session hosting service.

9. The non-transitory tangible computer readable storage medium of claim 1, further comprising the step of creating a data object for the visualization session in a collaboration application.

10. The non-transitory tangible computer readable storage medium of claim 9, wherein the data object is included as a post in a feed of data objects from the CRM service.

11. The non-transitory tangible computer readable storage medium of claim 9, wherein the data object is included as a post in a feed of data objects provided to a user of the CRM service who has elected to follow the customer record.

12. The non-transitory tangible computer readable storage medium of claim 1, further comprising maintaining visualization session statistics by the CRM service about visualization sessions initiated from the CRM service.

13. The non-transitory tangible computer readable storage medium of claim 12, wherein the visualization session statistics include a number of visualization sessions, duration of visualization sessions, and which agents initiated the visualization sessions from the CRM service.

14. The non-transitory tangible computer readable storage medium of claim 12, further comprising the step of enabling analytics to be built relative to the visualization sessions using the visualization session statistics and other information contained in the CRM database.

15. The non-transitory tangible computer readable storage medium of claim 14, wherein the analytics enable the visualization session statistics to be used in connection with other statistics maintained by the CRM service to show the effect of visualization sessions in the context of the other statistics maintained by the CRM service.

16. The non-transitory tangible computer readable storage medium of claim 1, wherein the visualization session is implemented using screen sharing software.

17. The non-transitory tangible computer readable storage medium of claim 1, wherein the step of obtaining contact information about the guest is implemented by the session hosting service when the guest joins the visualization session.

18. The non-transitory tangible computer readable storage medium of claim 17, wherein the CRM object is an Activity object, and wherein the Activity object is attached to a contact based object associated with the guest in the CRM service.

19. The non-transitory tangible computer readable storage medium of claim 18, wherein when the guest previously is unknown to the CRM service, the method further comprises the step of creating a contact object for the guest in the CRM service.

20. The non-transitory tangible computer readable storage medium of claim 1, wherein the visualization session is initiated from within the CRM service using a feature of a graphical user interface of the CRM service.

21. The non-transitory tangible computer readable storage medium of claim 1, wherein the visualization session involves providing a website that is browsed by the customer or the agent and through which the visual information is shared.

22. The non-transitory tangible computer readable storage medium of claim 21, further comprising the steps of capturing visual information by the agent, forwarding the captured visual information for display on the website, opening a browser by the customer, and directing the browser by the customer to the established website for the visualization session to view the visual information by the customer on the visualization session.

* * * * *